June 30, 1931.  O. K. KJOLSETH  1,812,793
SPRING SUSPENSION SYSTEM
Filed Dec. 12, 1930
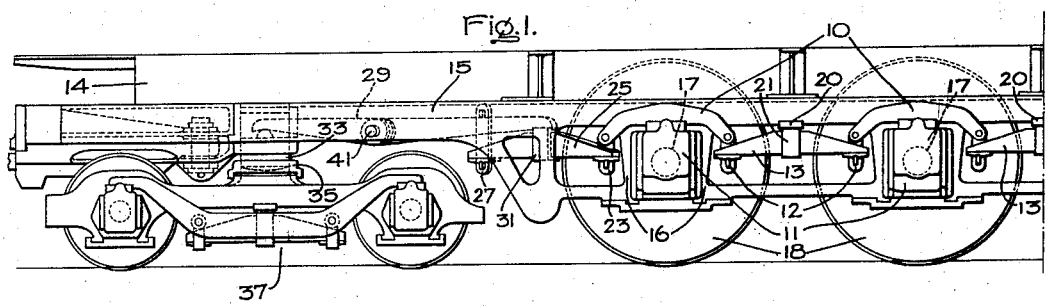
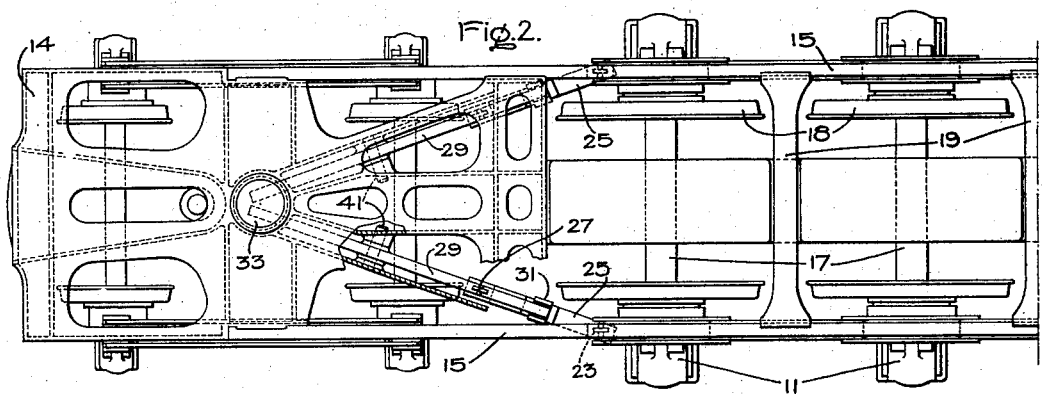
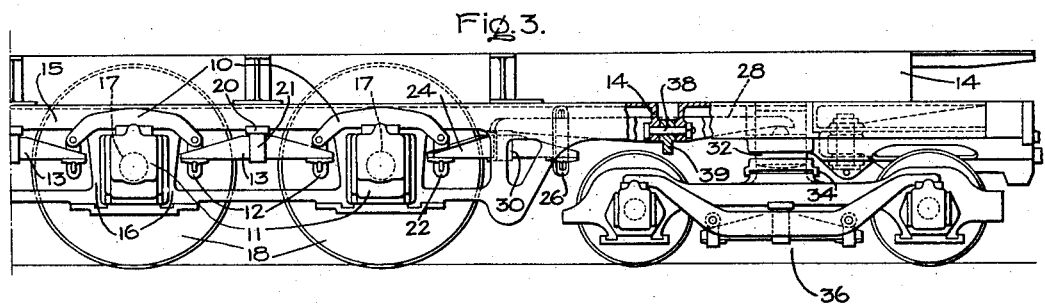
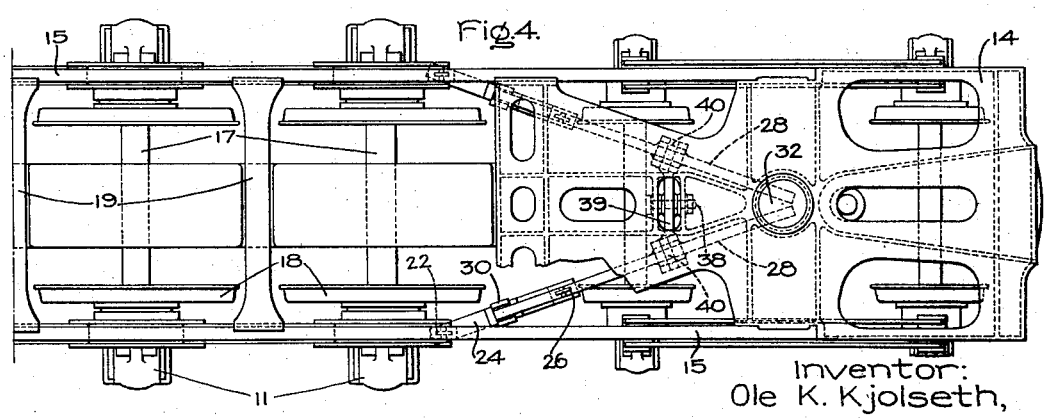
Inventor:
Ole K. Kjolseth,
by Charles E. Tullar
His Attorney.

Patented June 30, 1931

1,812,793

UNITED STATES PATENT OFFICE

OLE K. KJOLSETH, OF ERIE, PENNSYLVANIA, ASSIGNOR TO GENERAL ELECTRIC COMPANY, A CORPORATION OF NEW YORK

SPRING SUSPENSION SYSTEM

Application filed December 12, 1930. Serial No. 501,918.

My invention relates to spring suspension systems for locomotives or cars.

It has been the aim of locomotive and car builders to build as stable a structure as is possible to insure better and safer performance of their equipment. The stability of the structure as well as the efficient utilization of the tractive power of the vehicle has been found to be improved when the load is evenly distributed among the driving wheels and partly on the guiding trucks. In locomotives as heretofore constructed it has also been found desirable to distribute the shocks received when passing over imperfect joints or other irregularities in the track and to minimize the transfer of these vibrations to the superstructure. To effect these ends, it has long been the practice to connect several side springs of the spring suspension system by equalizers so as to evenly distribute the load on all the drivers and so that more than one spring is available at one time to absorb the concussions to which any one of the wheels is subjected, but the general methods used all have certain objectionable features. Some schemes propose mounting springs on the journal boxes and interconnecting them by equalizers pivotally connected to the underframe for supporting the same, but this practice requires considerable space above the journal boxes to accommodate the suspension rigging with the result that the center of gravity of the locomotive or car is raised, thereby decreasing the stability of the construction. Other systems employ springs supporting the underframe and suspended from equalizers mounted on the journal boxes, and employ coil springs under the outer end of the front and rear equalizers. This makes cross-equalization of the two sides of the locomotive or car impractical, and it is also difficult to connect this arrangement to diagonal equalizers. When diagonal equalizers are not used it produces a shortened effective spring rigging and wheel base, measured from the forward to the rear underframe suspension points, resulting in a rather hard riding locomotive, and requiring relatively complicated connections to the guiding trucks.

An object of my invention is to provide a simplified and improved spring suspension system for the superstructure of a locomotive or car, which will effectively distribute the weight of the superstructure among the driving wheels and partly on the guiding truck. Another object of my invention is to provide a means for readily absorbing the vibrations resulting from the wheels passing over irregularities in the track and insure the lateral stability of the construction. I accomplish these objects by providing a spring suspension system including a side spring rigging arranged to support part of the weight of the superstructure and connected by diagonally extending springs to diagonal equalizers mounted at the other end on auxiliary trucks and having supports sustaining part of the weight of the locomotive or car.

My invention will be more fully set forth in the following description referring to the accompanying drawings, and the features of novelty which characterize my invention will be pointed out with particularity in the claims appended to and forming a part of this specification.

In the drawings, Fig. 1 is a side elevation of the rear part of a locomotive showing a sideframe and underframe thereof in combination with an embodiment of my improved spring and equalizer suspension system; Fig. 2 is a plan view of the structure shown in Fig. 1, more clearly showing the arrangement of the rear diagonal equalizers and their connection to the locomotive body; Fig. 3 is a side elevation of the forward part of a locomotive showing the forward drivers and a guiding truck in conjunction with my novel spring suspension system, having a portion broken away to more clearly show the forward suspension point of the locomotive frame; Fig. 4 is a plan view of the structure shown in Fig. 3 more clearly showing the pivotal connection of the locomotive frame to the center of a cross-equalizer connecting the forward diagonal equalizers.

In carrying out my invention, as shown in the drawings, a side spring rigging constructed according to current practice is employed, including driver equalizers 10 mounted on journal boxes 11 and interconnected by spring hangers 12 to semi-elliptic springs 13. The locomotive superstructure is supported on an underframe 14 and is provided with sideframes 15 having pedestals 16 engaging journal boxes 11, which form the bearing housings for axles 17 of the drivers 18. The side frames are connected by transoms 19 and are provided with side bearings 20, which engage spring bands 21 and are supported thereby on the semi-elliptic side springs 13.

In accordance with my invention, the last driver equalizer at the forward and rear ends of the locomotive on both sides are connected by spring hangers 22 and 23 to the end of diagonally extending semi-elliptic leaf springs 24 and 25, respectively. The other ends of springs 24 and 25 are suspended in spring hangers 26 and 27 from diagonal equalizers 28 and 29, respectively. One end of the diagonal equalizers 28 and 29 rests on the spring bands 30 and 31 of the springs 24 and 25, and the other end is mounted in openings provided therefor in center pins 32 and 33 which are pivoted on the center plates 34 and 35 of the guiding and trailing bogie trucks 36 and 37, respectively.

The forward end of the locomotive platform structure 14, shown in Figs. 3 and 4, is connected to the equalizing system by a single pivotal suspension 38, from a cross equalizer 39, which connects the diagonal equalizers 28 at approximately their centers 40. This system equalizes shocks across the two sides of the locomotive and allows a slight lateral swaying of the superstructure, which combined with the flexibility of the diagonal equalizers 28 in series with leaf springs 24, gives a very efficient equalization of load between the guiding truck and drivers with the necessary flexibility for the best riding qualities.

The rear end of the locomotive underframe 14, shown in Figs. 1 and 2, is connected by suspension pins 41 to approximately the centers of the diagonal equalizers 29, providing points of support spaced far enough apart to have the effect of side bearings and to give the superstructure lateral stability. This novel combination of equalizer and spring elements gives the effect of a comparatively long wheel base and spring rigging, with the lateral flexibility desirable for best riding qualities and ease in taking curves in the track. It also provides for cross and longitudinal equalization of shocks received by the wheels, and for an even distribution of load between the drivers and the auxiliary trucks, combined with a plurality of side bearings affording the lateral stability required in this type of equipment.

Modifications of the construction which I have illustrated will occur to those skilled in the art so that I do not desire my invention to be limited to the particular arrangement disclosed, and I intend in the appended claims to cover all modifications thereof which do not depart from the spirit and scope of my invention.

What I claim as new and desire to secure by Letters Patent of the United States, is:—

1. In combination with a locomotive or car having a platform structure, main drivers and an auxiliary truck, of a spring suspension system including means for distributing the weight of said locomotive or car between said auxiliary truck and said main drivers, said means including a side spring rigging having supports on which said platform structure is mounted, diagonally extending springs, connected to the ends of said side spring rigging, and a plurality of diagonal equalizers connected to said platform structure for supporting the same, said diagonal equalizers being mounted on said auxiliary truck at one end and connected at the other end in series with said diagonally extending springs and thereby directly to said side spring rigging.

2. In combination with a locomotive or car having a platform structure, main drivers and auxiliary trucks, of a spring suspension system including means for distributing the weight of said locomotive or car between the drivers and the auxiliary trucks, said means comprising a side spring rigging having spring bands forming supports on which said platform structure is mounted, diagonal equalizers at the forward and rear ends of said spring suspension system having connections to said platform structure for supporting the same, said diagonal equalizers being supported at one end on said auxiliary trucks and having diagonally extending springs connecting them directly in series with said side spring rigging, and a crossequalizer connecting together said diagonal equalizers at the forward end for cross equalization of shocks received by the wheels on the two sides of the locomotive.

3. In combination with a locomotive or car having an underframe, main drivers, and auxiliary trucks, of a spring suspension system arranged to provide a flexible supporting means which will readily absorb shocks resulting from the wheels passing over irregularities in the tracks, said spring suspension system including driver equalizers and interconnecting side springs, diagonal equalizers positioned at the forward and rear ends of said spring suspension system, diagonal springs connecting said diagonal equalizers directly to said driver equalizers and side springs and a cross equalizer connecting the forward diagonal equalizers together and having a pivotal connection to said locomotive or car underframe for supporting the forward end of the same, said rear diagonal equalizers having separate connections to said underframe for supporting the rear end of the same.

4. In combination with a locomotive or car having an underframe, main driver wheels and axles, journal boxes for said axles, and auxiliary trucks, of a spring suspension system adapted to distribute the weight of said locomotive or car on said drivers and said auxiliary truck, said spring suspension system including driver equalizers mounted on said journal boxes and interconnecting side springs supporting said underframe, diagonal equalizers positioned at the forward and rear ends of said spring suspension system and having one end thereof mounted on said auxiliary trucks, diagonal springs directly connecting the other ends of said diagonal equalizers to said driver equalizers and side springs, a cross-equalizer connecting the forward diagonal equalizers together and having a single pivotal connection to the forward end of said underframe to afford lateral flexibility and to support the same, and said rear diagonal equalizers having separate connections to said underframe intermediate the end of said auxiliary truck and their connection to the ends of said diagonal spring giving the effect of side bearing affording the required stability for safe operation.

5. In combination with a locomotive or car having an underframe, main driving wheels and an auxiliary truck, of a spring suspension system for supporting said underframe on said truck and driving wheels including interconnected side springs and equalizers arranged to support said underframe on said driving wheels, and diagonal equalizers and springs arranged to carry a portion of the weight of said underframe and distribute the same between said side springs and said auxiliary truck.

In witness whereof, I have hereto set my hand this 10 day of December, 1930.

OLE K. KJOLSETH.